United States Patent [19]

Westermann

[11] Patent Number: 4,853,838
[45] Date of Patent: Aug. 1, 1989

[54] DISPLAY AND DATA-INSERTION MODULE HAVING MULTIPLE ASSEMBLY POSSIBILITIES

[75] Inventor: Alexis Westermann, Paris, France

[73] Assignee: M.P.I.Metrologie Pesage International, France

[21] Appl. No.: 165,215

[22] Filed: Mar. 8, 1988

[30] Foreign Application Priority Data

Mar. 12, 1987 [FR] France ............................. 87 03425

[51] Int. Cl.⁴ .......................... G06F 1/00; H05K 7/16
[52] U.S. Cl. ................................... 364/189; 364/708; 235/145 R; 235/146; 340/711; 400/682; 361/380; 361/390; 361/391
[58] Field of Search ................... 364/708, 188, 189; 361/390, 392, 393, 394, 419, 420, 427, 391, 380; 312/114; 235/145 R, 146; 340/711; 400/682

[56] References Cited

U.S. PATENT DOCUMENTS

| 1,979,514 | 11/1934 | Wilson | 312/114 |
|---|---|---|---|
| 3,904,937 | 9/1975 | Levin | 361/394 |
| 3,995,123 | 11/1976 | Wilson | 179/90 K |
| 4,345,147 | 8/1982 | Aaron et al. | 235/385 |
| 4,667,271 | 5/1987 | Wilson | 361/391 |
| 4,680,674 | 7/1987 | Moore | 361/395 |

FOREIGN PATENT DOCUMENTS

| 3330587 | 8/1983 | Fed. Rep. of Germany . |
| 8308818 | 5/1983 | France . |
| 2165684 | 4/1986 | United Kingdom . |

Primary Examiner—A. D. Pellinen
Assistant Examiner—David Osborn
Attorney, Agent, or Firm—Townsend and Townsend

[57] ABSTRACT

The module has a top (4) which is inclined with respect to an opposite bottom surface (4a) and bears display means (8) and data insertion means (9). The top (4) comprises a removable panel rotatable through 180° with respect to the casing, which in turn can be rotated through 180° so that the display means (8) and insertion means (9) are always disposed in the correct direction as regards the user.

8 Claims, 3 Drawing Sheets

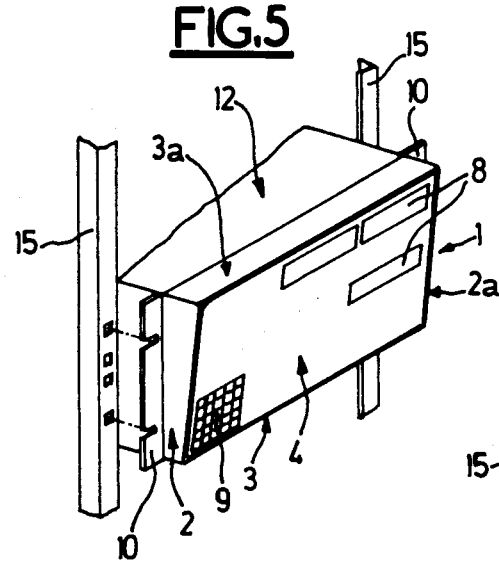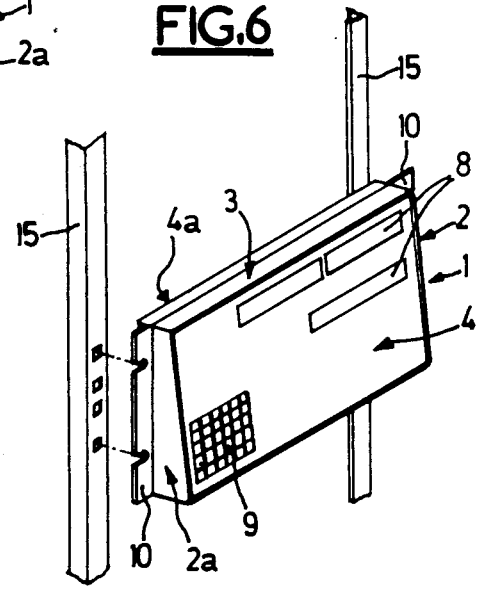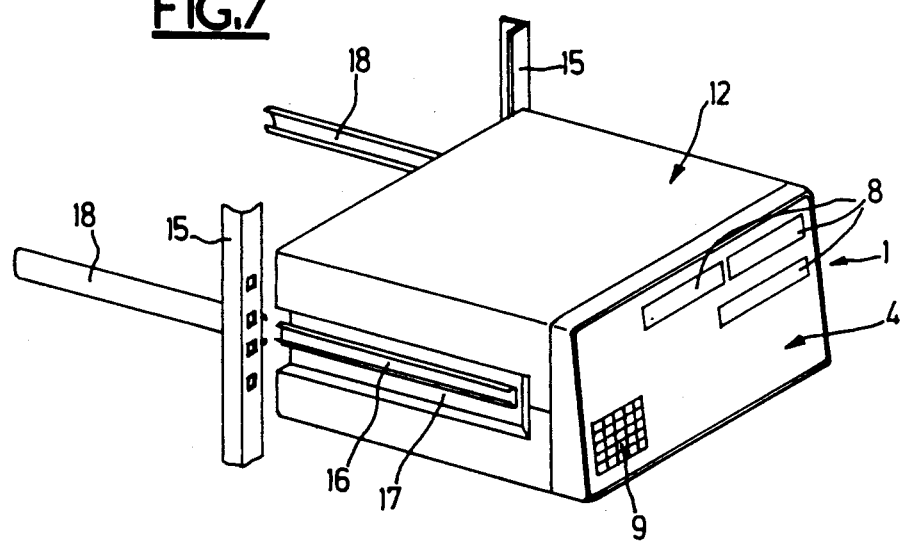

DISPLAY AND DATA-INSERTION MODULE HAVING MULTIPLE ASSEMBLY POSSIBILITIES

BACKGROUND OF THE INVENTION

The invention relates to a display and data-insertion modules, and more particularly to such modules comprising a casing in the form of a right prism having right-angled trapezoidal bases, display and data insertion means being provided on a surface of the casing which is inclined with respect to the opposite surface of the casing.

Prismatic modules of this kind are used, as an example when placed with one side on a horizontal support surface such a table, the opposite surface bearing the display and data-insertion means being inclined downwards towards the user. This has the advantage that the display means (e.g. light-emitting diode alphanumeric display means) or the data insertion means (e.g. keyboards) are more visible and accessible to the user than if on a horizontal surface of the module.

Similarly, in the case of vertically installed display and data insertion systems, the display and insertion means will often be more visible and easily accessible if disposed not on a vertical surface but on a surface which is inclined to the vertical in one or the other direction depending on whether the means are disposed below or above the user's eyes.

To meet this requirement regarding reading and improved access, it has hitherto been necessary to use different modules depending on the manner of installation.

SUMMARY OF THE INVENTION

The invention relates to a display and keyboard or other data insertion module having numerous assembly possibilities and, in all assembly positions, permitting optimum reading of the display means and/or optimum access to the data insertion means.

The invention also relates to a display and data insertion module for fitting to a box, while retaining the advantage of optimum visibility of the module display means and optimum access of the data insertion means irrespective of the position in which the box is fitted.

The display data insertion module according to the invention comprises a casing in the form of a right prism having rectangular trapezoidal bases, comprising a first pair of parallel trapezoidal equal opposite surfaces, a second pair of parallel rectangular unequal opposite surfaces, and a third pair of rectangular unequal opposite surfaces, comprising a base perpendicular to the first and second pairs of surfaces and a top at an inclination to the first and second pairs of surfaces and to the base, display and data insertion means being provided on the top. The inclined top of the casing comprises a removable panel which can be fitted to the box in a first position and in a second position in which the panel has been rotated through 180°.

As a result of this system, the same module can be used e.g. when vertically mounted in the bottom position with the top inclined upwards, or after rotation through 180° and vertically mounted in the top position, with the top inclined downwards, whereas the display and data insertion means provided on the top of the casing are in both cases disposed in the same direction for reading the display means and actuating the data insertion means.

The module according to the invention can be used simply with its base on a horizontal surface, but alternatively the casing can have removable means for securing it to a support which, in that case, can be either vertical, e.g. two uprights, or horizontal, in which case the module can be partly embedded in it.

The securing means may advantageously comprise two bars for fitting to two parallel opposite surfaces of the casing and with means such as screw holes on the bars for securing them to the support.

Preferably each bar has two spaced-apart lugs projecting from the same side of the bar, whereas the module casing has two spaced-apart slots in each first or second pair of surfaces for receiving the lugs.

The module according to the invention may be used alone or in combination with a box having a generally parallelepipedal shape, in which case one surface of the box will be recessed and surrounded with a flange or rim defining a cavity, into which the base of the module can be fitted.

In that case the box can comprise means for securing it to a vertical support, e.g. rails on two opposite sides for cooperating with slideways secured e.g. to vertical uprights.

The following is a more detailed description, with reference to the accompanying diagrammatic drawings, of a non-limitative embodiment of a module according to the invention and a number of sample applications of the module.

BRIEF DESCRIPTION OF THE DRAWINGS

FIG. 5 shows a method of mounting a module according to the invention, used in combination with a box, on a vertical support;

FIG. 6 shows a second method of mounting a module according to the invention, used alone, on a vertical support;

FIG. 7 shows a third method of mounting a module and box assembly on a vertical support.

DESCRIPTION OF THE PREFERRED EMBODIMENT

Figure 1:
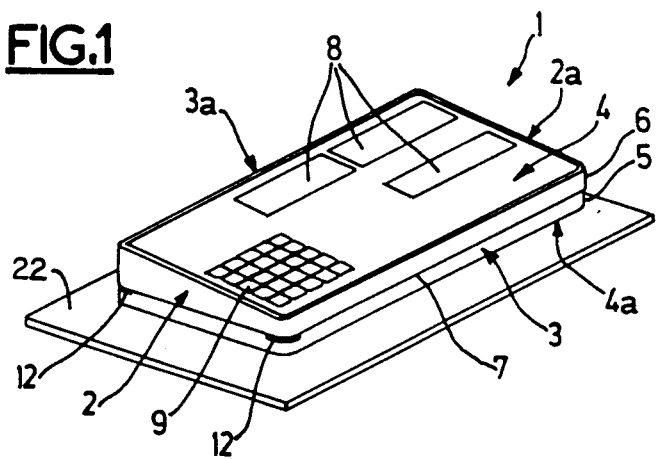
FIG. 1 is a break-away view of a module according to the invention used alone when placed on a horizontal support surface.

FIG. 1 shows a display and data insertion module comprising a flat casing 1 in the form of a right prism having rectangular trapezoidal bases and a first pair of two trapezoidal parallel opposite surfaces 2, 2a, only one surface (2) being shown in the drawing, a second pair of two rectangular opposite parallel unequal surfaces 3, 3a, only one (3) being shown in the drawing, and a third pair of opposite rectangular unequal surfaces 4, 4a inclined to one another, only one (4) being shown on the drawing. The four surfaces 2, 2a, 3, 3a constitute the sides of box 1, and the third pair of surfaces constitute the base (4a) and the top (4) of casing 1.

As shown in FIG. 1, casing 1 is divided into two parts 5, 6 fitted together along a joint plane 7 extending across the first and second pair of surfaces of the casing.

Figure 4:
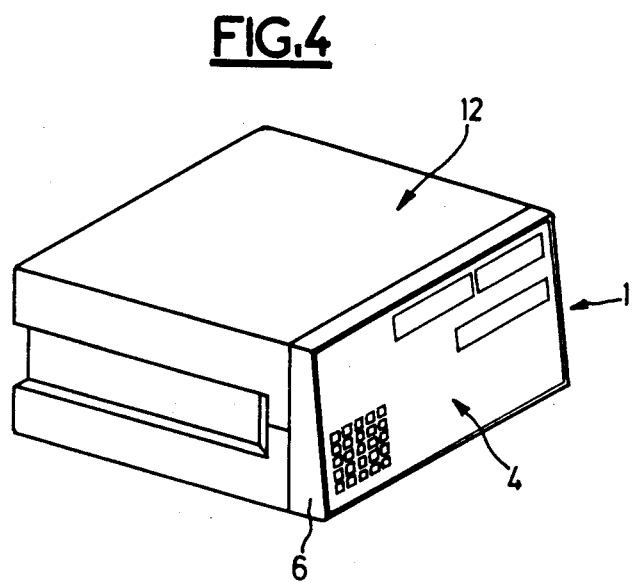

The top 4 comprises a removable panel bearing e.g. three display windows 8 comprising light-emitting diodes or the like, and a keyboard 9 or similar data insertion means for inserting data. FIG. 4 shows top 4 removed from casing 1.

In the embodiment in FIG. 1, the base 4a of the module simply rests on a horizontal support surface 22 such as a table, and the person using the module remains in front of it so that the upper or top surface 4 slopes towards him, thus making it easier to read the display means 8 and manipulate the data insertion keyboard 9.

Figure 2:
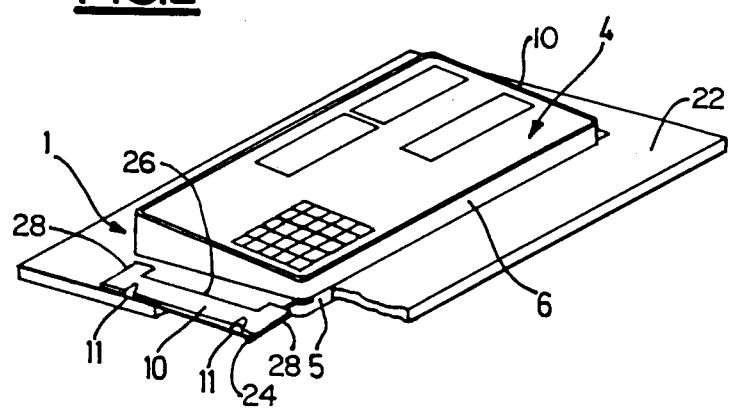
FIG. 2 shows the module of FIG. 1 used alone and fitted into a horizontal support surface.

FIG. 2 shows the module according to FIG. 1 fitted into a horizontal support 22 surface so that its top 4 is inclined in the same manner as in FIG. 1. The module is secured in the fitted-in position by means of two flat bars. Each bar 10 has one bar edge 24 with two slots 11 for securing screws, whereas on the opposite bar edge 26 there are two lugs 28 which fit into two slots 12 (see FIG. 1) in casing 1 at the level of the joint plane 7 in each trapezoidal surface 2. The casing part 5 thus fits into the support surface 22. The left-most bar 10 is shown pulled away from surface 2 for clarity. An identical bar 10 abuts surface 2a, whereas the casing part 6 and inclined top 4 project from this surface.

Figure 3:
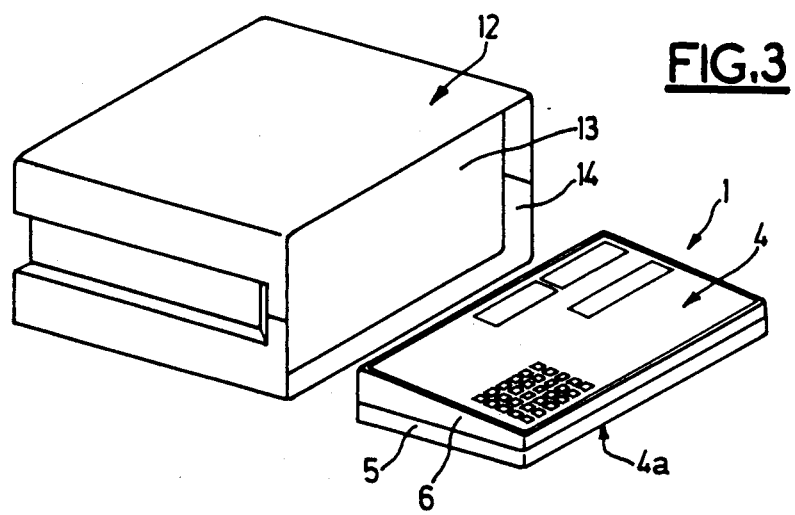
FIGS. 3 and 4 show two possible uses of a module according to the invention in combination with a box.

FIGS. 3 and 4 show two possible uses of module 1 in FIG. 1 in combination with a box 12. The box 12, which has a generally parallelepipedal shape, has a recessed surface 13 surrounded by a rim or flange 14 so as to define a cavity having dimensions (width and length) corresponding to the dimensions of the casing part 5.

Module 1 can therefore be used in combination with box 12 placed on a horizontal support surface so that surface 13 is vertical, either spatially separate form box 12 as in FIG. 3 and with its base on the horizontal support surface so that its top 4 is inclined to the horizontal towards the user in the same manner as in FIG. 1, or fitted into the box recess so that the top 4 is inclined to the vertical as shown in FIG. 4.

FIGS. 5 and 6 show two possibilities of mounting the module 1, either in combination with a box 12 as in FIG. 5 or alone as in FIG. 6, onto vertical supports which in the present case are two uprights 15 to which the module 1 is secured by two bars 10 attached in the same manner as in FIG. 2.

As a comparison between FIGS. 5 and 6 shows, the casing of module 1 is mounted in FIG. 5 so that the top 4 is inclined downwards, and in FIG. 6 so that the top 4 is inclined upwards with respect to the vertical. This result can be obtained simply by rotating casing 1 through 180°.

However, to ensure that in most cases the display components 8 and keyboard 9 are in the same position or orientation relative to a user, it is necessary that the top panel 4 be rotatable through 180° with respect to the casing 1. For this reason, the top 4 bearing the display means 8 and keyboard 9 comprises a removable panel which can be fitted to the casing in two different positions with respect thereto.

Thus, casing 1 can be secured with panel 4 in one position (FIG. 5) relative to the casing, at a height level with or above the user's eyes, or with the panel in the other position (FIG. 6) at a height level with or below the user's eyes, the panel in most cases being inclined for optimum reading of the display means 8 and optimum access to the data insertion keyboard 9. FIG. 7 shows a module 1 and box 12 assembly as in FIG. 4 mounted on two vertical supports comprising two uprights 15. In this case, the assembly is fitted together not by means of two bars 10 attached to module 1 as in FIG. 5, but by two rails 16 attached to the two lateral vertical opposite surfaces of box 12 in grooves 17 provided on these surfaces, and two slideways 18 secured in horizontal position on uprights 15 for receiving the rails 16 of box 12.

In the case of this embodiment also, of course, module 1 can be rotated so that the top 4 is inclined downwards instead of being inclined upwards with respect to the vertical. The top panel can be held in position for reading the display means 8 and operating the keyboard 9, by rotating the panel 4 with respect to module 1.

What is claimed is:

1. A data input and display module capable of horizontal and vertical mounting, comprising:
   a right-prism shaped casing having:
   equally dimensioned first and second spaced apart trapezoidally shaped sides;
   unequally dimensioned third and fourth spaced apart rectangularly shaped sides;
   edges of the first and second sides being attached to edges of the third and fourth sides such that the first, second, third and fourth sides define a perimeter of the casing;
   unequally dimensioned fifth and sixth spaced apart rectangularly shaped sides;
   the fifth side being attached at right angles to a lower edge of the first, second, third and fourth sides to form a casing bottom;
   the sixth side being removably attached to an upper edge of the first, second, third and fourth sides to form a casing top, inclined with respect to the casing bottom;
   the sixth side being attachable to the casing in a first position and in a second position wherein the sixth side is rotated 180° in its own plane with respect to the first position;
   means for inputting data, mounted on the sixth side;
   means for displaying data, mounted on the sixth side;
   wherein when the module is positioned on a horizontal support, the sixth side may be attached to the casing in a chosen first or second position such that the means for inputting data and the means for displaying data are inclined in a chosen orientation with respect to a user, providing thereby access and visibility to the user; and
   wherein when the module is positioned on a vertical support, the sixth side may be attached to the casing in a chosen first or second position such that the means for inputting data and the means for displaying data are inclined in a chosen orientation with respect to a user;
   access to and visibility of the means for inputting data and the means for displaying data being provided to the user irrespective of horizontal or vertical module orientation.

2. A module according to claim 1, wherein the first and second sides are parallel to one another, and the third and fourth sides are parallel to one another.

3. A module according to claim 1, wherein:
   the first and second sides define a slot; and
   further including a detachable flat bar having first and second opposite edges;
   the first edge including a lug adapted to engage the slot in a chosen first or second side of the module;
   the second edge defining a slot for receiving a screw;
   wherein the module is secured to a support by engaging the lug of the flat bar in a slot in a chosen first or second side of the module, and by passing a screw through the slot in the bar and attaching the screw to the support.

4. A module according to claim 1, further including:
a generally parallelepipedally shaped box having a recessed surface sized to receive the fifth side of the module;
a flange surrounding the recessed surface; and
means for mounting the box to a support;
wherein the flange is used to mount the box to a support, and the fifth side of the module is inserted into the recessed surface of the box.

5. A module according to claim 1, wherein the means for inputting data includes a keyboard, and the means for displaying data includes a digital display.

6. A data input and display module comprising a casing in the form of a right prism having right-angled trapezoidal bases, a first pair of trapezoidal equal parallel opposite surfaces, a second pair of unequal rectangular parallel opposite surfaces, and a third pair of unequal rectangular opposite surfaces comprising a base surface perpendicular to the first and second pair of surfaces and a top surface inclined with respect to said base surface said top surface being formed by a rectangular top panel provided with data input and display means turned outwardly, said top panel being able to be located with respect to said top portion in a first position and in a second position in which said top panel is rotated by 180° in its own plane with respect to said first position, so that said module may be used in an horizontal position, wherein said top panel with said data input and display means in inclined with respect to the horizontal plane towards a user of said means, in a first low vertical position, wherein said top panel with said data input and display means is inclined with respect to the vertical plane upwardly towards a user, and in a second high vertical position, wherein said top panel with said data input and display means is inclined with respect to the vertical plane downwardly towards a user.

7. A module according to claim 6, further comprising means for removably securing it to a support, wherein said means comprise two spaced-apart slots in each of said first pair of surfaces of said casing, and two flat bars having two opposite edges, each said bar being provided on one of said edges with two spaced-apart lugs fitting into said two slots of said casing and on the other of said edges with two slots receiving screws for securing said bars to said support.

8. A module according to claim 6, further including a generally parallelepipedally shaped box having a recessed surface sized to receive the base surface of the module, a flange surrounding the recessed surface, and means for mounting the box to a support;
wherein the box is mounted to a support and the base surface of the module is inserted into the recessed surface of the box.

* * * * *